United States Patent
Park et al.

(10) Patent No.: US 10,989,951 B2
(45) Date of Patent: Apr. 27, 2021

(54) LIQUID CRYSTAL DISPLAY INCLUDING GLASS DIFFUSER PLATE

(71) Applicant: LG Display Co., Ltd., Seoul (KR)

(72) Inventors: Jinseo Park, Goyang-si (KR); Youngkyu Bang, Gimpo-si (KR); Sunghwan Yoon, Paju-si (KR); Yongik Hwang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 71 days.

(21) Appl. No.: 15/857,254

(22) Filed: Dec. 28, 2017

(65) Prior Publication Data
US 2018/0188591 A1    Jul. 5, 2018

(30) Foreign Application Priority Data

Dec. 30, 2016 (KR) .................... 10-2016-0183928

(51) Int. Cl.
*G02F 1/1335* (2006.01)
*G02F 1/1333* (2006.01)
(Continued)

(52) U.S. Cl.
CPC .... *G02F 1/133504* (2013.01); *G02F 1/13306* (2013.01); *G02F 1/13452* (2013.01);
(Continued)

(58) Field of Classification Search
None
See application file for complete search history.

(56) References Cited

U.S. PATENT DOCUMENTS

| 4,939,003 A * | 7/1990 | Aoki ................. G02F 1/133711 349/132 |
| 7,924,391 B2 * | 4/2011 | Choi ..................... H05K 1/147 349/149 |

(Continued)

FOREIGN PATENT DOCUMENTS

| CN | 1609662 A | 4/2005 |
| CN | 101930137 A | 12/2010 |

(Continued)

OTHER PUBLICATIONS

Chinese Office Action and Search Report dated Jun. 29, 2020 issued in corresponding Patent Application No. 201711285801.7 w/English Translation (20 pages).

(Continued)

*Primary Examiner* — Edward J Glick
*Assistant Examiner* — David Y Chung
(74) *Attorney, Agent, or Firm* — Polsinelli PC

(57) ABSTRACT

A liquid crystal display is disclosed. The liquid crystal display includes a liquid crystal display panel including an upper glass substrate and a lower glass substrate that are disposed opposite each other with a liquid crystal layer interposed therebetween, a glass diffuser plate provided on a back surface of the liquid crystal display panel, an adhesive layer provided at an edge between the liquid crystal display panel and the glass diffuser plate, a light source provided at a back surface of the glass diffuser plate, and a cover bottom including a vertical portion that supports an edge of the glass diffuser plate at the back surface of the glass diffuser plate and is opposite to a side of the light source, and a horizontal portion that is extended from the vertical portion and is opposite to a back surface of the light source.

14 Claims, 12 Drawing Sheets

(51) Int. Cl.
  *G02F 1/133* (2006.01)
  *G02F 1/1345* (2006.01)
  *G02F 1/13357* (2006.01)

(52) U.S. Cl.
  CPC .. *G02F 1/133308* (2013.01); *G02F 1/133553* (2013.01); *G02F 1/133606* (2013.01); *G02F 1/133608* (2013.01); *G02F 1/133603* (2013.01); *G02F 1/133605* (2013.01); *G02F 2202/28* (2013.01)

(56) References Cited

U.S. PATENT DOCUMENTS

| | | | | |
|---|---|---|---|---|
| 2001/0001459 | A1* | 5/2001 | Savant | G02B 5/0221 |
| | | | | 216/24 |
| 2002/0113924 | A1 | 8/2002 | Saito et al. | |
| 2008/0186429 | A1* | 8/2008 | Hamamatsu | G02B 5/0242 |
| | | | | 349/64 |
| 2009/0046217 | A1 | 2/2009 | Fukayama | |
| 2009/0190071 | A1* | 7/2009 | Kubota | G02F 1/133512 |
| | | | | 349/96 |
| 2010/0073591 | A1 | 3/2010 | Choi et al. | |
| 2011/0187956 | A1* | 8/2011 | Kim | G02F 1/1333 |
| | | | | 349/58 |
| 2012/0300153 | A1* | 11/2012 | Fujii | G02F 1/133615 |
| | | | | 349/58 |
| 2013/0027857 | A1* | 1/2013 | Jeong | G02F 1/133512 |
| | | | | 361/679.01 |
| 2014/0168574 | A1* | 6/2014 | Matsubara | G02F 1/133308 |
| | | | | 349/62 |
| 2014/0184985 | A1* | 7/2014 | Liu | G02F 1/133602 |
| | | | | 349/61 |
| 2014/0368764 | A1* | 12/2014 | Lee | G02F 1/133308 |
| | | | | 349/58 |
| 2015/0271482 | A1* | 9/2015 | Chen | G02F 1/134309 |
| | | | | 349/65 |
| 2016/0103356 | A1* | 4/2016 | Shin | G02F 1/13452 |
| | | | | 349/33 |
| 2016/0291385 | A1* | 10/2016 | Yoshikawa | G02F 1/133603 |
| 2018/0113353 | A1* | 4/2018 | Chen | G02F 1/133528 |

FOREIGN PATENT DOCUMENTS

| | | |
|---|---|---|
| CN | 102209868 A | 10/2011 |
| CN | 103032777 A | 4/2013 |
| CN | 203052411 U | 7/2013 |
| CN | 105467678 A | 4/2016 |
| CN | 105511138 A | 4/2016 |
| CN | 101285903 A | 10/2018 |
| JP | H05313161 A | 11/1993 |
| JP | 2009040900 A | 2/2009 |
| KR | 20060005154 A | 1/2006 |

OTHER PUBLICATIONS

Chinese Office Action dated Mar. 2, 2021 issued in Patent Application No. 201711285801.7 w/English Translation (10 pages).

* cited by examiner

LIQUID CRYSTAL DISPLAY INCLUDING GLASS DIFFUSER PLATE

CROSS REFERENCE TO RELATED APPLICATION

This application claims the priority benefit of Korean Patent Application No. 10-2016-0183928 filed on Dec. 30, 2016, which is incorporated herein by reference for all purposes as if fully set forth herein.

BACKGROUND

Field of the Disclosure

The present disclosure relates to a display device, and more particularly, to a liquid crystal display including a glass diffuser plate.

Description of the Background

Liquid crystal displays have been applied to portable computers such as notebook PCs, office automation devices, audio/video devices, advertising display devices for indoor or outdoor uses, and so on. The liquid crystal display controls an electric field applied to a liquid crystal layer of a liquid crystal display panel and modulates light provided by a backlight unit, thereby displaying an image.

The backlight unit may be classified as an edge type backlight unit or a direct type backlight unit. In the edge type backlight unit, light sources are positioned opposite the side of a light guide plate, and a plurality of optical sheets is positioned between the liquid crystal display panel and the light guide plate. In the edge type backlight unit, the light sources irradiate light onto one side of the light guide plate, and the light guide plate converts a line light source or a point light source into a surface light source and irradiates light onto the liquid crystal display panel. In the direct type backlight unit, light sources are positioned under the liquid crystal display panel, and light diffused by a diffuser plate is irradiated onto the liquid crystal display panel.

The liquid crystal display panel and the backlight unit are assembled together with case members for fixing them to implement a liquid crystal module. The case members may include a guide panel, a cover bottom, a case top, and the like.

Because the conventional liquid crystal display is comprised of a large number of components as described above, it is difficult to design liquid crystal displays of a thin profile and light weight. Thus, the conventional liquid crystal displays are difficult to be applied to various fields. Further, in an effort to design the liquid crystal display of the thin profile and the light weight if the case members are removed, light emitted from light sources may leak to the outside and may be visually perceived by a user.

SUMMARY

Accordingly, aspects of the present disclosure are directed to a liquid crystal display including a glass diffuser plate that substantially obviates one or more of the problems due to limitations and disadvantages of the related art.

In one aspect of the present disclosure, there is provided a liquid crystal display including a liquid crystal display panel including an upper glass substrate and a lower glass substrate that face each other with a liquid crystal layer interposed therebetween; a glass diffuser plate provided on a back surface of the liquid crystal display panel; an adhesive layer provided at an edge between the liquid crystal display panel and the glass diffuser plate; a light source provided at a back surface of the glass diffuser plate; and a cover bottom including a vertical portion that supports an edge of the glass diffuser plate at the lower surface of the glass diffuser plate and faces a side of the light source, and a horizontal portion that is extended from the vertical portion and faces to a lower surface of the light source.

In another aspect of the present disclosure, a liquid crystal display includes a glass diffuser plate; a liquid crystal display panel on the glass diffuser plate; an adhesive layer attaching the glass diffuser plate and the liquid crystal display panel; a cover bottom including a vertical portion that supports an edge of the glass diffuser plate at the lower surface of the glass diffuser plate and faces a side of the light source, and a horizontal portion that is extended from the vertical portion and faces a lower surface of the light source; and a support member having first and second parts, the first part attached to at least one lateral side of the glass diffuser plate and the liquid crystal display panel, and the second part extended from the first part and disposed to be parallel to the vertical portion of the cover bottom.

BRIEF DESCRIPTION OF THE DRAWINGS

The accompanying drawings, which are included to provide a further understanding of the disclosure and are incorporated in and constitute a part of this specification, illustrate aspects of the disclosure and together with the description serve to explain the principles of the disclosure.

In the drawings.

DETAILED DESCRIPTION OF THE ASPECTS

Reference will now be made in detail to aspects of the disclosure, examples of which are illustrated in the accompanying drawings. Wherever possible, the same reference numbers will be used throughout the drawings to refer to the same or like parts. Detailed descriptions of known arts will be omitted if such may mislead the aspects of the disclosure.

The terms "first", "second", etc. may be used to describe various components, but the components are not limited by such terms. The terms are used only for the purpose of distinguishing one component from other components. For example, a first component may be designated as a second component, and vice versa, without departing from the scope of the present disclosure.

Figure 1:
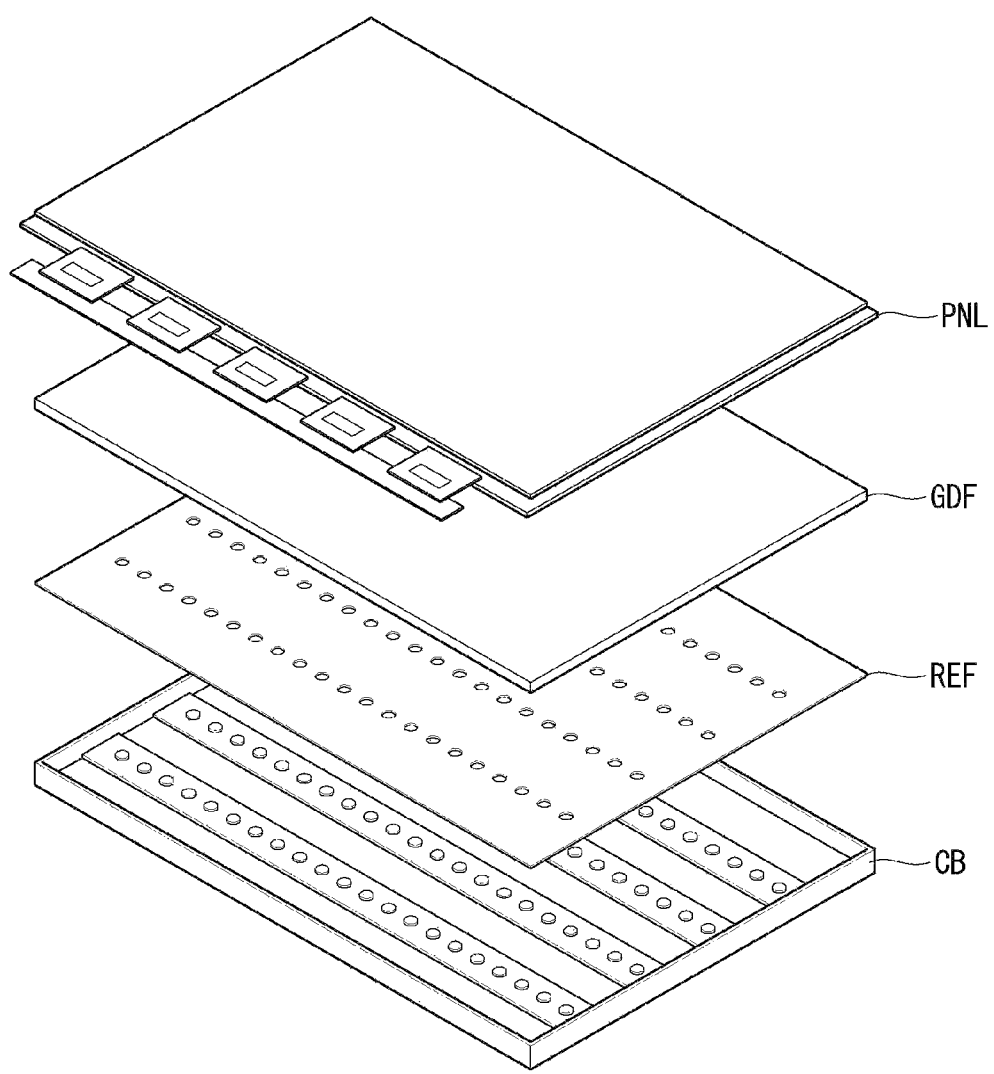
FIG. 1 is an exploded perspective view of a liquid crystal display according to an aspect of the disclosure.
Figure 2:
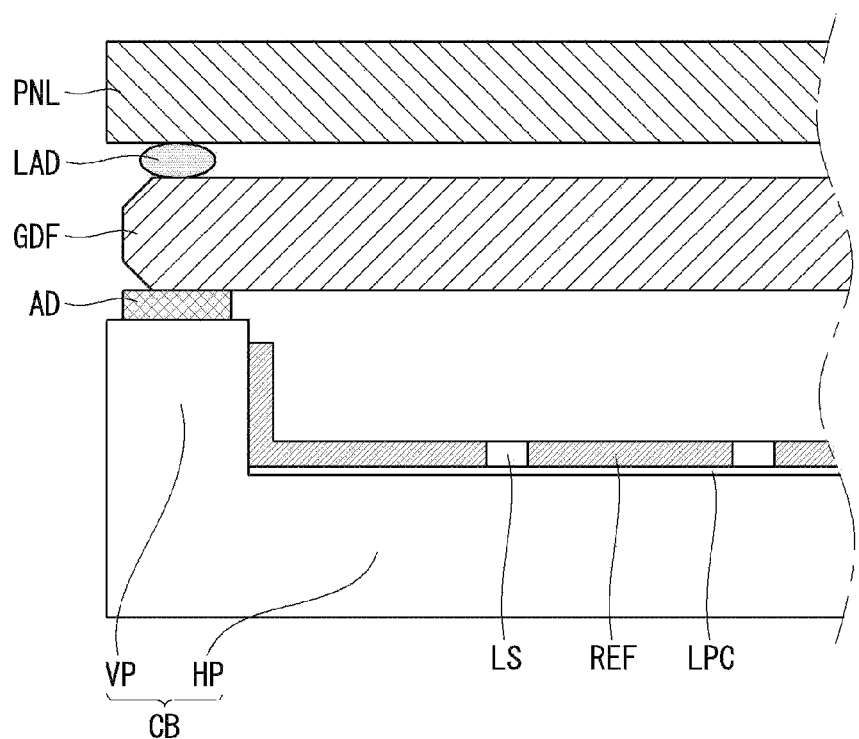
FIG. 2 is a cross-sectional view of a liquid crystal display according to an aspect of the disclosure.

A liquid crystal display according to an aspect of the disclosure is described with reference to FIGS. 1 and 2. FIG. 1 is an exploded perspective view of a liquid crystal display according to an aspect of the disclosure. FIG. 2 is a cross-sectional view of a liquid crystal display according to an aspect of the disclosure.

As shown in FIGS. 1 and 2, a liquid crystal display according to an aspect of the disclosure includes a liquid crystal display panel PNL and a backlight unit.

The liquid crystal display panel PNL includes a lower glass substrate, an upper glass substrate, and a liquid crystal layer between the lower glass substrate and the upper glass substrate. A plurality of data lines (not shown) and a plurality of gate lines (not shown) intersect each other on the lower glass substrate of the liquid crystal display panel PNL. The liquid crystal display panel PNL includes liquid crystal cells arranged in a matrix form in accordance with a crossing structure of the data lines and the gate lines. Thin film transistors (not shown), pixel electrodes (not shown) of the liquid crystal cells connected to the thin film transistors, storage capacitors (not shown), etc. are formed on the lower glass substrate of the liquid crystal display panel PNL. The liquid crystal cells are driven by an electric field generated by a difference between a data voltage supplied to the pixel electrodes through the data lines and a common voltage supplied to a common electrode (not shown), and adjust an amount of light transmitted by the liquid crystal display panel PNL.

Black matrixes (not shown), color filters (not shown), and the common electrode are formed on the upper glass substrate of the liquid crystal display panel PNL. The common electrode is formed on the upper glass substrate in a vertical electric field driving manner such as a twisted nematic (TN) mode and a vertical alignment (VA) mode. The common electrode is formed on the lower glass substrate along with the pixel electrode in a horizontal electric field driving manner such as an in-plane switching (IPS) mode and a fringe field switching (FFS) mode. Polarizing plates (not shown) may be respectively attached to the upper and lower glass substrates of the liquid crystal display panel PNL. The polarizing plate transmits only a portion (of a specific direction) of light provided by the backlight unit. Alignment layers for setting a pre-tilt angle of liquid crystals are respectively formed on inner surfaces contacting the liquid crystals in the upper and lower glass substrates of the liquid crystal display panel PNL.

A driver of the liquid crystal display panel PNL includes a gate driver, a data driver, and a timing controller. The data driver includes a plurality of data driver integrated circuits (ICs). The data driver converts digital video data into positive and negative analog data voltages using positive and negative gamma compensation voltages under the control of the timing controller and supplies the data voltages to the data lines. The gate driver sequentially outputs gate pulses (or scan pulses) under the control of the timing controller and supplies the gate pulses to the gate lines. The timing controller receives the digital video data and timing signals from a system board in which an external video source is embedded. The timing signals may include a vertical sync signal, a horizontal sync signal, a data enable signal, a dot clock signal, and the like. The timing controller generates timing control signals for controlling operation timings of the data driver and the gate driver based on the digital video data and the timing signals. The timing controller outputs the timing control signals for controlling operation timings of the data driver and the gate driver to the data driver and the gate driver. The data driver and the gate driver may be implemented in a chip-on glass (COG) manner or a chip-on film (COF) manner.

The backlight unit includes light sources LS, a light source printed circuit board (PCB) LPC, a reflective sheet REF, a glass diffuser plate GDF. The backlight unit according to the aspect of the disclosure is implemented as a direct type backlight unit. Namely, the backlight unit according to the aspect of the disclosure is configured such that the light sources LS and the glass diffuser plate GDF are sequentially stacked under the liquid crystal display panel PNL.

The light sources LS may be implemented as a light emitting diode (LED) package having advantages of high efficiency, high luminance, and low power consumption. The plurality of light sources LS may be used, and a position and an arrangement density of the plurality of light sources may be properly selected in consideration of optical characteristics.

The light sources LS receive an electrical signal from a light source driver through the light source PCB LPC and are turned on and off. The light source PCB LPC includes a circuit for electrically connecting the light sources LS to the light source driver. The light source PCB LPC may be formed as a metal light source PCB. In this instance, the light source PCB LPC may be formed of aluminum that is advantageous for heat dissipation.

The reflective sheet REF may be disposed on the light source PCB LPC and may be formed in an area excluding a formation area of the light sources LS. For example, the reflective sheet REF on the light source PCB LPC may expose the light sources LS through a through hole penetrating the reflective sheet REF. However, aspects of the disclosure are not limited thereto. The backlight unit can increase the efficiency of light incident on the liquid crystal display panel PNL using the reflective sheet REF.

The reflective sheet REF may have a shape bent at a predetermined angle. Namely, at least one side of the reflective sheet REF may be bent to have a predetermined angle. A bending angle of the reflective sheet REF may be properly selected in consideration of the efficiency of light. For example, the reflective sheet REF may be bent based on shapes of a horizontal portion HP and a vertical portion VP of a cover bottom CB which will be described later.

The glass diffuser plate GDF is disposed on the light sources LS. The glass diffuser plate GDF may include a glass plate and a diffusion pattern layer. The glass plate may correspond to a base plate for patterning the diffusion pattern layer. The glass diffuser plate GDF may be implemented by laminating an optical sheet on the glass plate.

The aspect of the disclosure does not use a diffuser plate formed of a plastic-based material such as polycarbonate (PC) but a diffuser plate formed of a glass material having good thermal characteristics. Because the aspect of the disclosure uses the diffuser plate formed of the glass material, an expansion, a contraction, and a displacement of the diffuser plate resulting from external environmental factors can be minimized. Hence, the aspect of the disclosure can minimize change in position and shape of the diffuser plate depending on change in a temperature and thus can prevent a reduction in optical characteristics of the liquid crystal display resulting from the change in position and shape of the diffuser plate. Further, interference between the diffuser plate and other component resulting from the change in position of the diffuser plate can be minimized.

The liquid crystal display panel PNL and the backlight unit are assembled together with a case member such as the cover bottom CB to implement a liquid crystal module.

The cover bottom CB may have an L-shaped cross-section having at least one bent portion. The cover bottom CB includes the horizontal portion HP and the vertical portion VP. The horizontal portion HP is positioned opposite back surfaces of the light sources LS and covers the back surfaces of the light sources LS. The vertical portion VP is extended from the horizontal portion HP and is positioned opposite the side of the light sources LS to cover the side of the light sources LS. The vertical portion VP is extended from one end of the horizontal portion HP in a forward direction. Namely, the vertical portion VP has a shape extended from the horizontal portion HP in the forward direction. The light sources LS, the light source PCB LPC, and the reflective sheet REF are accommodated in an inner space provided by the horizontal portion HP and the vertical portion VP of the cover bottom CB.

The vertical portion VP of the cover bottom CB uniformly maintains a distance between the light sources LS and the glass diffuser plate GDF. Namely, a height of the vertical portion VP may be properly selected in consideration of an optical gap between the light sources LS and the glass diffuser plate GDF.

The cover bottom CB may include a material having high thermal conductivity and high rigidity so as to smoothly dissipate heat from a driver circuit and the light sources LS to the outside. For example, the cover bottom CB may be manufactured as a metal plate such as aluminum, aluminum nitride (AlN), electrolytic galvanized iron (EGI), stainless steel, galvalume steel coil (SGLC), aluminum coated steel (ALCOSTA), and steel plated tin (SPTE). Further, a high conductive material for accelerating the heat transfer may be coated on the metal plate.

The cover bottom CB and the glass diffuser plate GDF may be fixed to each other by an adhesive member AD. The adhesive member AD is interposed between an edge of the glass diffuser plate GDF and the vertical portion VP of the cover bottom CB. The adhesive member AD can function to confine and restrict a mutual movement of the glass diffuser plate GDF and the cover bottom CB and also function to buffer a given external force. Further, the adhesive member AD includes a light shielding material capable of preventing light from leaking to an edge of the liquid crystal display panel PNL and thus can serve as a light shielding member. The adhesive member AD may be a double-sided tape, but is not limited thereto.

The glass diffuser plate GDF and the liquid crystal display panel PNL are fixed to each other by an adhesive layer LAD. Namely, the aspect of the disclosure uses a liquid adhesive material which can be applied, so as to fix the glass diffuser plate GDF and the liquid crystal display panel PNL to each other. The adhesive layer LAD may be a resin, but is not limited thereto.

In case of a sheet adhesive such as a double-sided tape, the sheet adhesive has a structure in which an adhesive material is stacked on a base material. Therefore, the sheet adhesive has to secure a predetermined area for maintaining a shape of the base material. In this instance, there is a limit in reducing an adhesive area. Thus, it is necessary to minimize the adhesive area, which is a factor that increases a bezel area. Further, most of light diffused from the light sources LS through the glass diffuser plate GDF is directed to the liquid crystal display panel PNL. However, a portion of the light may be blocked by the adhesive layer LAD, or a path of the partial light may be deflected to an unnecessary direction. This leads to a reduction in the efficiency of light. Thus, it is necessary to minimize the adhesive areas.

The aspect of the disclosure fixes the glass diffuser plate GDF and the liquid crystal display panel PNL by applying a liquid adhesive material between the glass diffuser plate GDF and the liquid crystal display panel PNL and curing the liquid adhesive material. The adhesive layer LAD according to the aspect of the disclosure does not need to secure the area occupied by the above-described base material and thus can minimize the adhesive area. In addition, the aspect of the disclosure can implement a narrow bezel by minimizing the adhesive area and improve the efficiency of light.

In order to fix the movement of the liquid crystal display panel PNL, the aspect of the disclosure does not need to cover the edge of the liquid crystal display panel PNL with a separate component such as a case top. Therefore, the aspect of the disclosure can eliminate or reduce a bezel generated by covering the edge of the liquid crystal display panel PNL by the case top. Further, the aspect of the disclosure does not need to include a component such as a guide panel (or a guide light or a support side). Thus, the aspect of the disclosure can provide a liquid crystal display of a thin profile and light weight.

The aspect of the disclosure fixes the diffuser plate and the liquid crystal display panel PNL using only the adhesive layer LAD interposed between the diffuser plate and the liquid crystal display panel PNL. Therefore, when the diffuser plate and the liquid crystal display panel PNL have different thermal characteristics, optical characteristics of the liquid crystal display may be reduced due to mutual interference between the diffuser plate and the liquid crystal display panel PNL.

More specifically, the lower glass substrate and the upper glass substrate of the liquid crystal display panel PNL are formed of a glass material. In this instance, when the diffuser plate that is attached to the lower glass substrate (or the upper glass substrate) using the adhesive layer LAD is formed of a plastic material as in the conventional design, the diffuser plate and the glass substrate are different in an amount (or degree) of expansion, contraction, and displacement resulting from external environmental factors such as change in temperature and humidity due to a difference in thermal characteristics between the diffuser plate and the glass substrate. The optical characteristics of the liquid crystal display may be distorted depending on a difference in the amount of expansion, contraction, and displacement between the diffuser plate and the glass substrate. Further, the liquid crystal display panel PNL and the diffuser plate may not be fixed through the adhesive layer LAD, may be detached from each other, or may be misaligned.

The aspect of the disclosure uses the glass diffuser plate GDF of a glass material having the same thermal characteristics as the lower glass substrate (or the upper glass substrate) of the liquid crystal display panel PNL, thereby minimizing the defect resulting from the difference in the thermal characteristics between them. Hence, the aspect of the disclosure can provide a liquid crystal display device that ensures the reliability and the stability of the product.

Unlike the aspect of the disclosure, it may be considered that a component for covering the liquid crystal display panel PNL and the side of the diffuser plate is further provided, in order to prevent the liquid crystal display panel PNL and the diffuser plate from being unfixed and detached from each other because of the difference in the thermal characteristics. However, in this instance, the aesthetics of the liquid crystal display are deteriorated due to an increase in the bezel area, and it is difficult to implement the liquid crystal display of thin profile and light weight because of additional components.

The aspect of the disclosure fixes the glass diffuser plate GDF using the cover bottom CB that is not exposed to the side of the glass diffuser plate GDF, and directly fixes the liquid crystal display panel PNL to the glass diffuser plate GDF using the adhesive layer LAD without a separate component such as the case top. Hence, the aspect of the disclosure can provide a liquid crystal display of thin profile and light weight while implementing the narrow bezel.

A liquid crystal display according to an aspect of the disclosure is described with reference to FIGS. 3 to 5B. FIGS. 3 to 5B illustrate a liquid crystal display according to an aspect of the disclosure.

Figure 3:
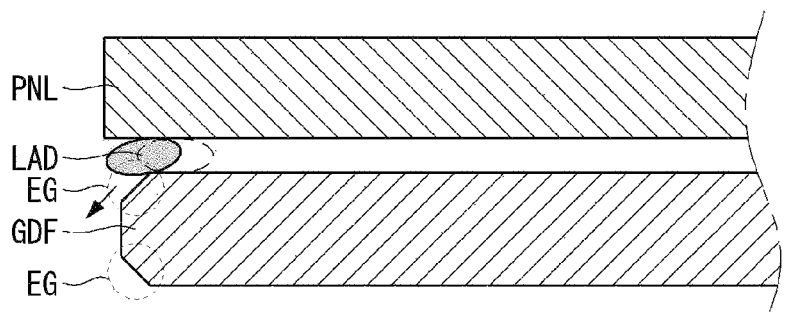
FIGS. 3 to 5B illustrate a liquid crystal display according to an aspect of the disclosure.

Referring to FIG. 3, the aspect of the disclosure may pattern an edge EG of a glass diffuser plate GDF to have a predetermined curvature or a chamfer shape, in order to ensure handling stability, breakage prevention, and handling convenience of the glass. In this instance, because an adhesive material constituting an adhesive layer LAD has fluidity before being cured, the adhesive material is applied to the glass diffuser plate GDF and then does not remain in a previously determined portion of the glass diffuser plate GDF, thereby flowing down to the patterned edge EG of the glass diffuser plate GDF. This may result in adhesion failure. As a result, a liquid crystal display panel PNL and the glass diffuser plate GDF may not be fixed to each other and may be detached from each other or misaligned.

Figure 4A:
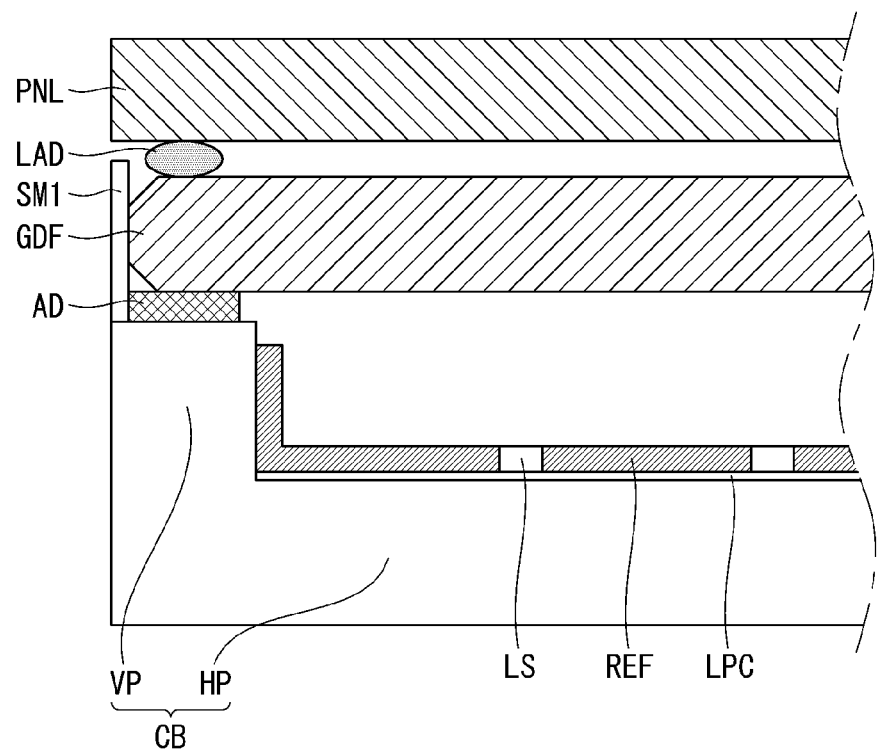
Figure 4B:
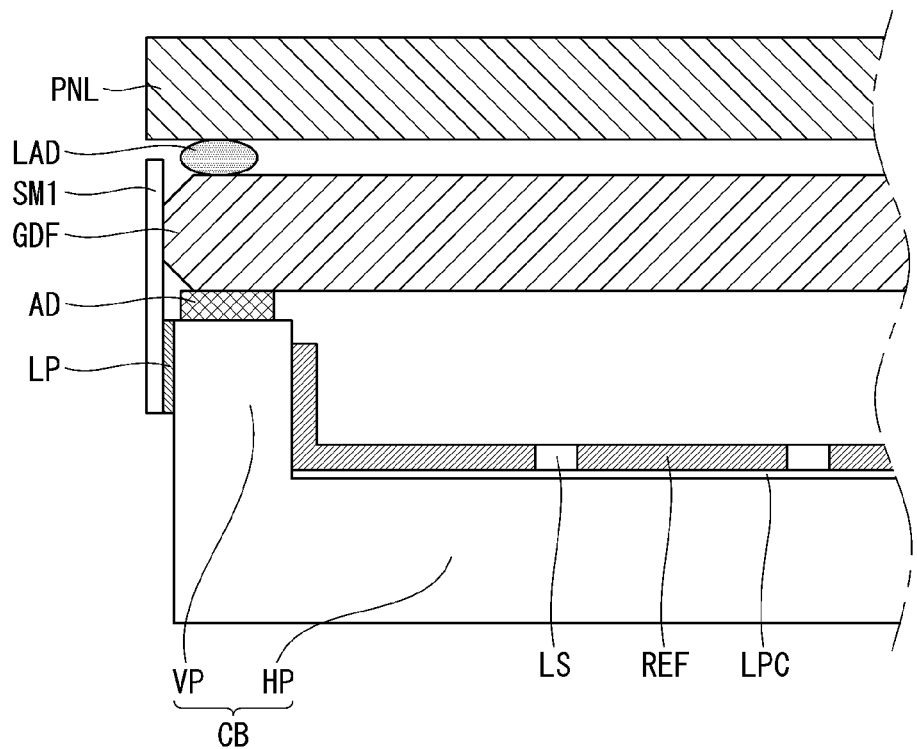

Referring to FIGS. 4A and 4B, the liquid crystal display according to an aspect of the disclosure further includes a first support member SM1. The first support member SM1 is positioned opposite at least one side of the glass diffuser plate GDF and covers at least one side of the glass diffuser plate GDF. The first support member SM1 is disposed on the side of the glass diffuser plate GDF and prevents a deviation of the adhesive layer LAD. Namely, even if the adhesive material constituting the adhesive layer LAD flows along the patterned edge EG of the glass diffuser plate GDF before being cured, the first support member SM1 can confine and restrict a movement of the adhesive layer LAD within a previously set area of the glass diffuser plate GDF so that the adhesive layer LAD is not deviated to the outside, and can guide the adhesive layer LAD so that the adhesive layer LAD is at a predetermined position of the glass diffuser plate GDF. The first support member SM1 may be referred to as a stopper or a barrier for preventing a deviation of the adhesive layer LAD.

The aspect of the disclosure can prevent the deviation of the adhesive layer LAD by providing the first support member SM1. Hence, the aspect of the disclosure has an advantage that the adhesion failure between the liquid crystal display panel PNL and the glass diffuser plate GDF can be minimized. The aspect of the disclosure can prevent the glass diffuser plate GDF being detached from the liquid crystal display panel PNL by minimizing the adhesion failure between the liquid crystal display panel PNL and the glass diffuser plate GDF. As a result, the aspect of the disclosure can provide the liquid crystal display that can prevent a reduction in optical characteristics, prevent interference with other devices during the process continuation and the transfer and the use of the product, and ensure the yield, the stability, and the reliability of product.

The first support member SM1 may be made of a plastic material, for example, polycarbonate (PC) that can be molded into a mold. Alternatively, the first support member SM1 may include a metal material. When the first support member SM1 includes the metal material, the first support member SM1 can secure predetermined rigidity even with a relatively thin thickness. Therefore, the first support member SM1 can be relatively easily fastened and fixed to other component such as a cover bottom CB by various methods. In this instance, the liquid crystal display according to the aspect of the disclosure can implement a narrow bezel through the first support member SM1 having a relatively thin thickness.

The first support member SM1 may be directly attached to the side of the glass diffuser plate GDF by an adhesive member. Alternatively, the first support member SM1 may be fastened to other component such as the cover bottom CB by a connecting member LP. For example, the first support member SM1 and a vertical portion VP of the cover bottom CB may be fastened to each other with a hook structure. In this instance, one of the first support member SM1 and the vertical portion VP of the cover bottom CB may include a hook, and the other may include a hook groove (or hook hole) that is fastened to the hook. As another example, the first support member SM1 and the vertical portion VP of the cover bottom CB may be fastened to each other with a screw structure. As another example, the first support member SM1 and the vertical portion VP of the cover bottom CB may be fixed to each other by an adhesive member such as a double-sided tape. Hence, the aspect of the disclosure can prevent the first support member SM1 from deviating or moving from its position by a given external force.

The first support member SM1 may be fixed to at least one of the glass diffuser plate GDF and the cover bottom CB. When the first support member SM1 is not fixed to the glass diffuser plate GDF and is fixed only to the cover bottom CB, a gap may be generated between the first support member SM1 and the side of the glass diffuser plate GDF due to a process error. In this instance, the adhesive layer LAD may flow down through the gap. Thus, the first support member SM1 may be directly fixed to the glass diffuser plate GDF. The first support member SM1 may be fastened to both the glass diffuser plate GDF and the cover bottom CB, so as to more firmly fix the first support member SM1.

Figure 5A:
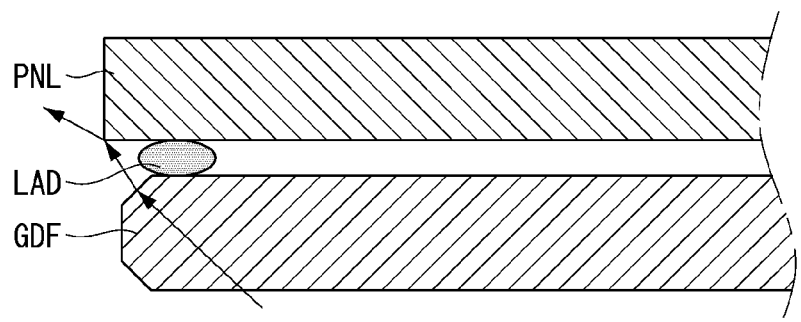
Figure 5B:
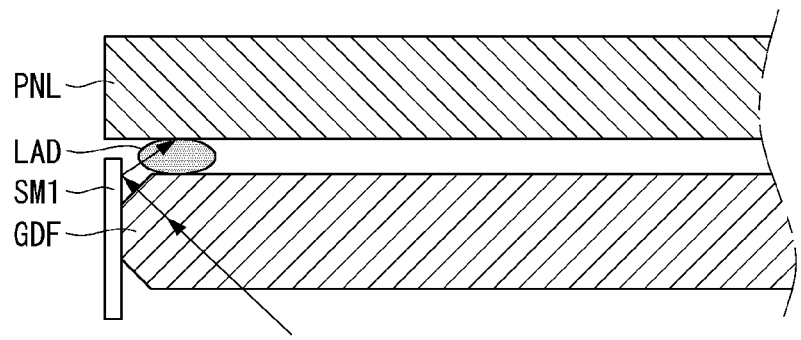

Referring to FIGS. 5A and 5B, the liquid crystal display according to the aspect of the disclosure includes the glass diffuser plate GDF having an edge that is patterned in a round shape or a chamfer shape. The patterned edge of the glass diffuser plate GDF may generate a light leakage phenomenon in which a portion of light emitted from light sources LS is not directed to the liquid crystal display panel PNL and is diffused to the outside. A user may recognize a liquid crystal display, in which the light leakage phenomenon is occurred, as a defective liquid crystal display. Thus, the light leakage phenomenon may be a factor reducing the reliability of the liquid crystal display.

In order to prevent the light leakage phenomenon, the liquid crystal display according to the aspect of the disclosure may include the first support member SM1 having light reflection characteristics. Namely, the first support member SM1 can serve as a stopper preventing the deviation of the adhesive layer LAD and also function to again reflect light, that is emitted from the light sources LS toward the outside, to the liquid crystal display panel PNL. The first support member SM1 having the light reflection characteristics may be formed of white polycarbonate, but is not limited thereto. The aspect of the disclosure can prevent the light leakage phenomenon by preventing or reducing light from the light sources LS from being emitted to the outside and can greatly improve the efficiency of light.

For example, the first support member SM1 may be formed as a single layer including a material having light reflection characteristics. As another example, the first support member SM1 may have a double-layered structure in which a base member having predetermined rigidity and a sheet (or film) having light reflection characteristics are stacked. In this instance, the sheet is formed on one surface of the base member positioned opposite the side of the glass diffuser plate GDF.

The first support member SM1 may have a multi-layered structure, if necessary or desired. In this instance, a layer of the first support member SM1 closest to the side of the glass diffuser plate GDF may be a sheet having light reflection characteristics. The number of layers constituting the first support member SM1 may be properly determined in consideration of a thickness of the first support member SM1, so as to implement the narrow bezel.

A liquid crystal display according to another aspect of the disclosure is described with reference to FIGS. 6 to 8B. FIGS. 6 to 8B illustrate a liquid crystal display according to another aspect of the disclosure.

Another aspect of the disclosure is configured such that a component such as a case top and a guide panel is removed to implement a liquid crystal display of a thin film and light weight. It is necessary to prevent a light leakage phenomenon (resulting from the configuration according to another aspect), in which light from light sources LS accommodated in a cover bottom CB is emitted to the outside and is recognized by a user. The user may recognize a liquid crystal display, in which the light leakage phenomenon is occurred, as a defective liquid crystal display. Thus, the light leakage phenomenon may be a factor reducing the reliability of the liquid crystal display.

Figure 6:
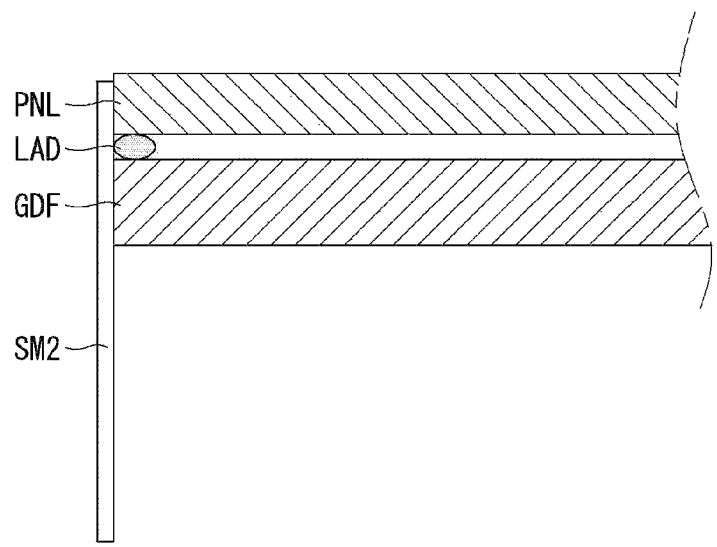
FIGS. 6 to 8B illustrate a liquid crystal display according to another aspect of the disclosure.

Referring to FIG. 6, the liquid crystal display according to another aspect of the disclosure further includes a second support member SM2. The second support member SM2 is positioned opposite at least one side of a glass diffuser plate GDF and covers at least one side of the glass diffuser plate GDF. The second support member SM2 can be extended up to the side of a liquid crystal display panel PNL and covers the side of the liquid crystal display panel PNL.

The second support member SM2 includes a light shielding material and thus can prevent the light leakage. Alternatively, the second support member SM2 includes a light reflective material and thus can prevent the light leakage and improve the efficiency of light by reflecting light emitted toward the outside to the liquid crystal display panel PNL. The second support member SM2 can support the side of the liquid crystal display panel PNL and confine and restrict a movement of the liquid crystal display panel PNL to the side. The second support member SM2 may be formed of polycarbonate (PC) and polyethylene terephthalate (PET), but is not limited thereto.

Figure 7A:
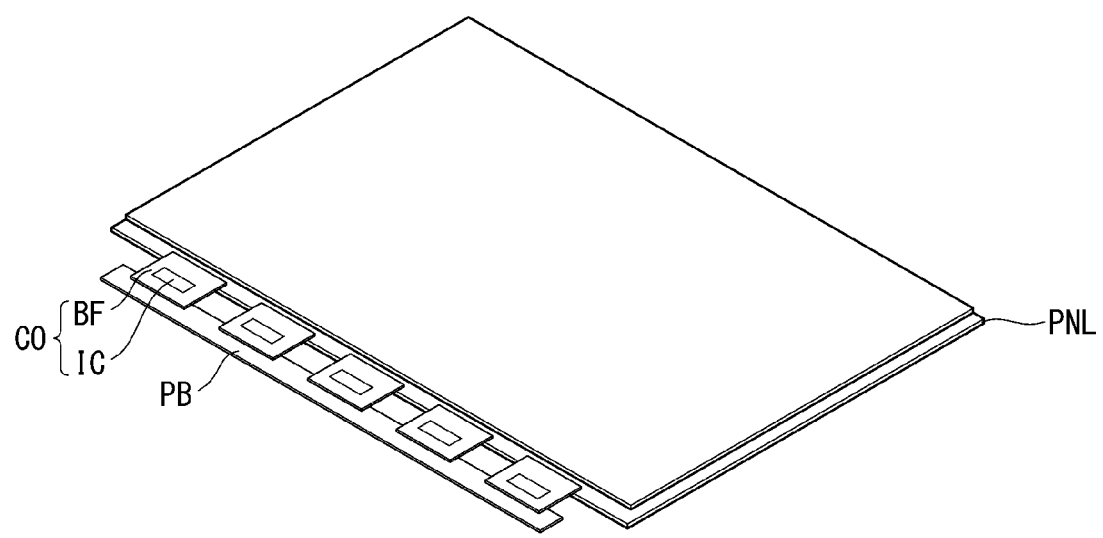

As shown in FIG. 7A, the liquid crystal display according to another aspect of the disclosure includes a circuit unit CO attached to the liquid crystal display panel PNL. The circuit unit CO may be implemented by a chip-on film (COF) method in which a driver integrated circuit (IC) IC is mounted on a flexible film BF. One end of the circuit unit CO may be attached to the liquid crystal display panel PNL through an anisotropic conductive film (ACF), and the other end may be connected to a PCB PB. The flexible film BF of the circuit unit CO may bend in a backward direction of the lower glass substrate along one side of the liquid crystal display panel PNL.

Figure 7B:
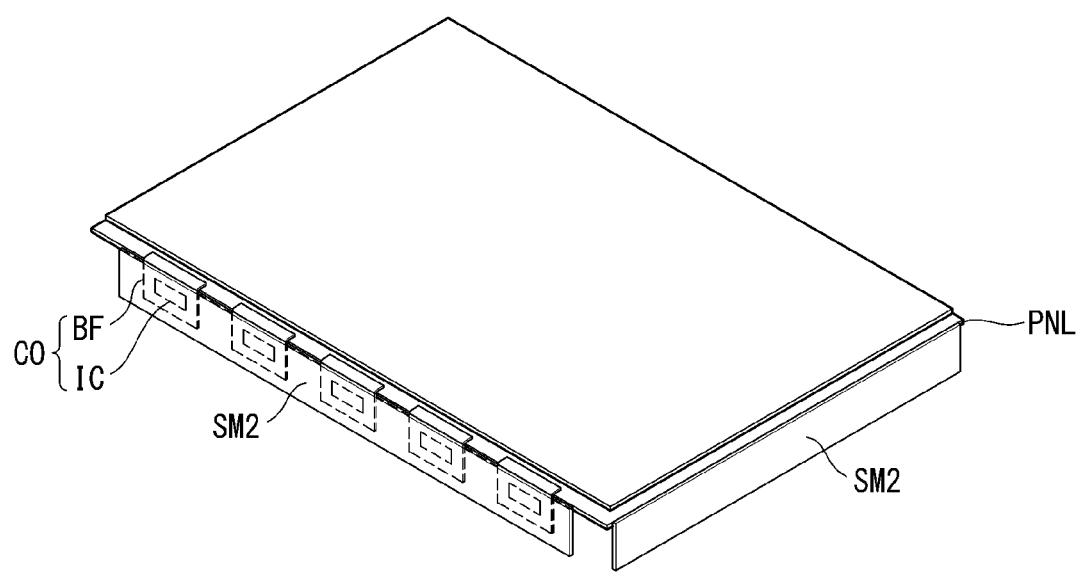

For example, as shown in FIG. 7B, the second support member SM2 may be disposed on the side of the liquid crystal display panel PNL to which the circuit unit CO is not attached. As another example, the second support member SM2 may be disposed on the side of the liquid crystal display panel PNL to which the circuit unit CO is attached. In this instance, the second support member SM2 may be positioned opposite at least one of both surfaces of the flexible film BF of the circuit unit CO. As another example, the second support member SM2 may be disposed on both the side of the liquid crystal display panel PNL, to which the circuit unit CO is not attached, and the side of the liquid crystal display panel PNL to which the circuit unit CO is attached.

Figure 7C:
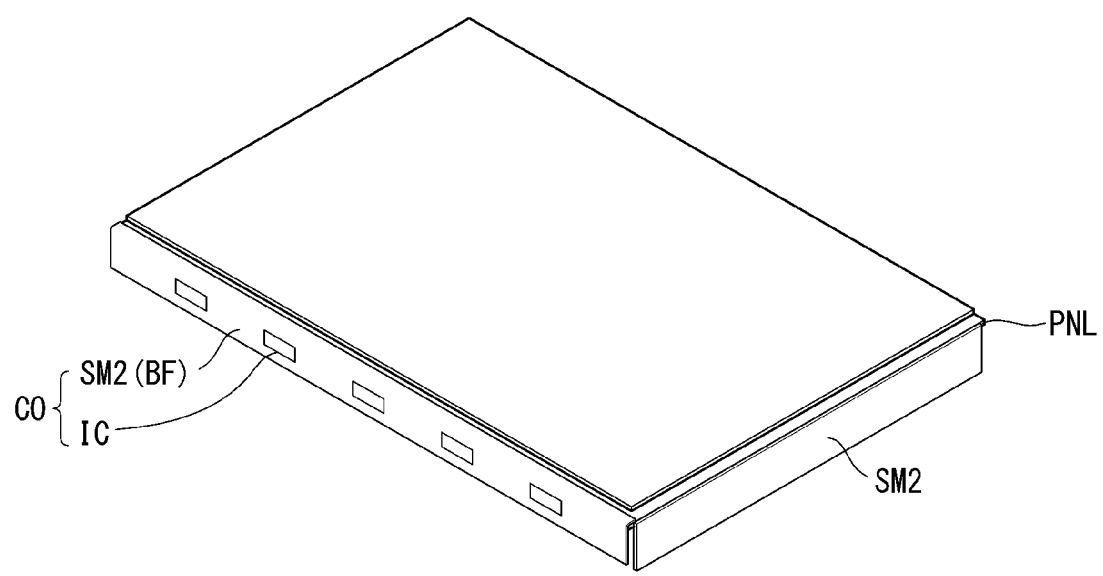

Alternatively, as shown in FIG. 7C, the second support member SM2 may be the flexible film BF of the circuit unit CO. In this instance, the plurality of driver ICs IC may be disposed on one second support member SM2 (i.e., a base film BF) at intervals of a predetermined distance, instead of a configuration in which the driver ICs IC are respectively disposed on the plurality of flexible films BF that is separated from one another. The second support member SM2 may be attached to the liquid crystal display panel PNL through an anisotropic conductive film.

Figure 8A:
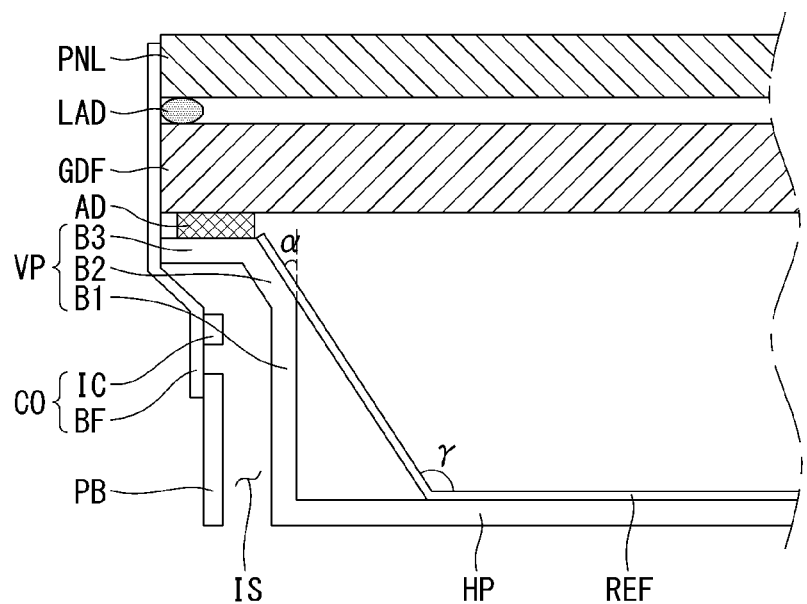
Figure 8B:
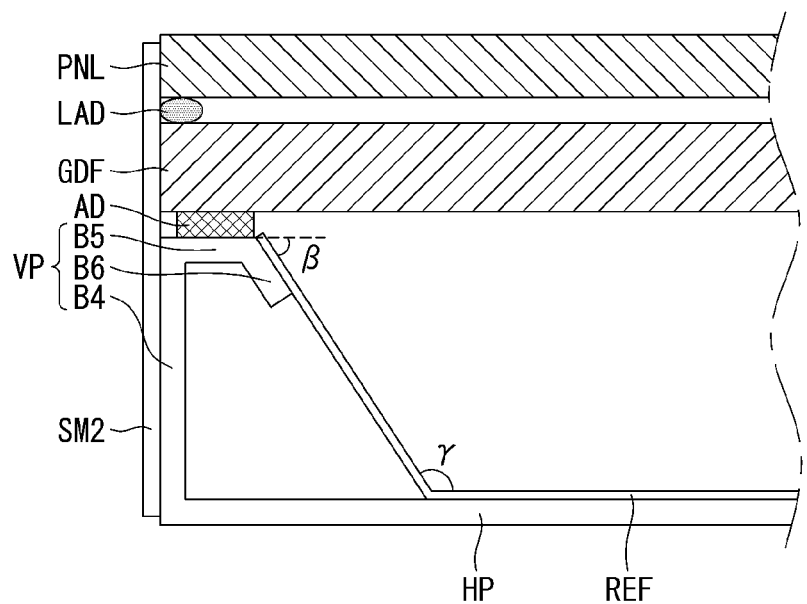

Referring to FIGS. 8A and 8B, the second support member SM2 may be attached to at least one of the side of the upper glass substrate and the side of the lower glass substrate of the liquid crystal display panel PNL through an adhesive member. In order to firmly fix the second support member SM2, the second support member SM2 may be attached to the side of the glass diffuser plate GDF through the adhesive member.

Alternatively, the second support member SM2 may be fastened to other component such as the cover bottom CB. For example, the second support member SM2 and the cover bottom CB may be fastened to each other with a hook structure. In this instance, one of the second support member SM2 and the cover bottom CB may include a hook, and the other may include a hook groove (or hook hole) that is fastened to the hook. As another example, the second support member SM2 and the cover bottom CB may be fastened to each other with a screw structure. As another example, the second support member SM2 and the cover bottom CB may be fixed to each other by an adhesive member such as a double-sided tape. Hence, another aspect of the disclosure can prevent the second support member SM2 from deviating or moving from its position by a given external force.

The vertical portion VP of the cover bottom CB may include two bent portions.

As shown in FIG. 8A, in an area in which the circuit unit CO is provided, the vertical portion VP is bent to the outside. A portion of the circuit unit CO, which is bent in the backward direction of the liquid crystal display panel PNL, and the PCB PB are accommodated in a space IS provided by bending the vertical portion VP to the outside.

In the area in which the circuit unit CO is provided, the vertical portion VP may include a first body B1, a second body B2, and a third body B3. As shown in FIG. 8A, the first body B1, the second body B2, and the third body B3 may be integrated as one body. The space IS in which the circuit unit CO is accommodated, is determined by shapes of the first body B1, the second body B2, and the third body B3.

The first body B1 is a portion where one end contacts one end of a horizontal portion HP of the cover bottom CB and the other end is extended in the forward direction. The second body B2 is a portion where one end contacts the other end of the first body B1 and the other end is inclined at a predetermined angle $\alpha$ and extended in the forward direction. The third body B3 is a portion where one end contacts the other end of the second body B2 and the other end is extended to the outside in parallel with the horizontal portion HP.

The circuit unit CO (and/or the driver ICs IC mounted on the circuit unit CO) and the PCB PB connected to the circuit unit CO are accommodated in a space provided by the shape of the vertical portion VP. Hence, the PCB PB does not protrude to the outside of the liquid crystal display panel PNL. As a result, the narrow bezel can be implemented.

The second body B2 is inclined at the predetermined angle $\alpha$ so that the side of a reflective sheet REF can be placed on the second body B2. The inclined angle $\alpha$ of the second body B2 may be set corresponding to an inclined angle $\gamma$ of the side of the reflective sheet REF. The inclined angle γ of the side of the reflective sheet REF may be properly selected in consideration of the efficiency of light. The third body B3 is positioned at a back surface of the glass diffuser plate GDF with an adhesive member AD interposed therebetween and supports the glass diffuser plate GDF.

As shown in FIG. 8B, in an area in which the circuit unit CO is not provided, the vertical portion VP is bent to the inside. In the area in which the circuit unit CO is not provided, the vertical portion VP may include a fourth body B4, a fifth body B5, and a sixth body B6. The fourth body B4, the fifth body B5, and the sixth body B6 may be formed as one body.

The fourth body B4 is a portion where one end contacts one end of the horizontal portion HP and the other end is extended in the forward direction. The fifth body B5 is a portion where one end contacts the other end of the fourth body B4 and the other end is extended to the inside in parallel with the horizontal portion HP. The sixth body B6 is a portion where one end contacts the other end of the fifth body B5 and the other end is inclined at a predetermined angle β and extended in the backward direction.

The fifth body B5 is positioned at the back surface of the glass diffuser plate GDF with an adhesive member AD interposed therebetween and supports the glass diffuser plate GDF. The sixth body B6 is inclined at the predetermined angle β so that the side of the reflective sheet REF can be placed on the sixth body B6. The inclined angle β of the sixth body B6 may be set corresponding to an inclined angle γ of the side of the reflective sheet REF. The inclined angle γ of the side of the reflective sheet REF may be properly selected in consideration of the efficiency of light.

A height from the horizontal portion HP to the third body B3 is substantially the same as a height from the horizontal portion HP to the fifth body B5. Thus, the glass diffuser plate GDF and the liquid crystal display panel PNL supported by the third body B3 and the fifth body B5 are leveled.

The reflective sheet REF may be accommodated in an inner space provided by the horizontal portion HP and the vertical portion VP of the cover bottom CB, and at least one side of the reflective sheet REF may be bent at the predetermined angle γ and placed on at least one of the second body B2 and the sixth body B6. Hence, the reflective sheet REF may be accommodated in the cover bottom CB while maintaining a previously set shape.

Although aspects have been described with reference to a number of illustrative aspects thereof, it should be understood that numerous other modifications and aspects can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display, comprising:
a liquid crystal display panel including an upper glass substrate and a lower glass substrate facing each other with a liquid crystal layer interposed therebetween;
a glass diffuser plate disposed below a lower surface of the liquid crystal display panel;
an adhesive layer attaching the liquid crystal display panel and the glass diffuser plate at an edge thereof;
a light source disposed below a lower surface of the glass diffuser plate;
a cover bottom including a vertical portion that supports an edge of the glass diffuser plate at the lower surface of the glass diffuser plate and faces a side of the light source, and a horizontal portion that is extended from the vertical portion and faces a lower surface of the light source;
an adhesive member interposed between the vertical portion of the cover bottom and the edge of the glass diffuser plate; and
a support member facing at least one lateral side of the glass diffuser plate and covering at least part of the region between the liquid crystal display panel and the glass diffuser plate, and the support member disposed directly on the upper surface of the vertical portion of the cover bottom and fixed to at least one of the glass diffuser plate and the cover bottom and the liquid crystal display panel by the adhesive member,
wherein the support member has a light reflection capability, and
wherein the glass diffuser plate is in contact with the support member.

2. The liquid crystal display of claim 1, wherein at least one side of the glass diffuser plate includes an edge having one of a round shape and a chamfer shape.

3. The liquid crystal display of claim 1, wherein the glass diffuser plate is made of the same material as the lower glass substrate.

4. The liquid crystal display of claim 1, wherein the first support member has a multi-layered structure.

5. The liquid crystal display of claim 4, wherein a layer of the multi-layered structure disposed closest to the side of the glass diffuser plate has a light reflection capability.

6. A liquid crystal display, comprising:
a liquid crystal display panel including an upper glass substrate and a lower glass substrate facing each other with a liquid crystal layer interposed therebetween;
a glass diffuser plate disposed below a lower surface of the liquid crystal display panel;
an adhesive layer attaching the liquid crystal display panel and the glass diffuser plate at an edge thereof;
a light source disposed below a lower surface of the glass diffuser plate;
a cover bottom including a vertical portion that supports an edge of the glass diffuser plate at the lower surface of the glass diffuser plate and faces a side of the light source, and a horizontal portion that is extended from the vertical portion and faces a lower surface of the light source; and
a support member facing at least one lateral side of the glass diffuser plate and covering at least part of the region between the liquid crystal display panel and the glass diffuser plate, and
the support member fixed to at least one of the glass diffuser plate, the cover bottom and the liquid crystal display panel,
wherein the support member has a light reflection capability, further comprising:
a circuit unit attached to liquid crystal display panel; and
a printed circuit board electrically connected to the circuit unit,
wherein the printed circuit board is accommodated in a space provided by the vertical portion of the cover bottom,
wherein the vertical portion of the cover bottom comprises:

a first body having one end connected to one end of the horizontal portion and the other end extended toward the glass diffuser plate;

a second body having one end connected to the other end of the first body and the other end that is inclined at a predetermined angle and is extended toward the glass diffuser plate; and a third body having one end connecting to the other end of the second body and the other end that is extended to the outside in parallel to the horizontal portion and supports the glass diffuser plate.

7. The liquid crystal display of claim 6, wherein the printed circuit board does not protrude from a side of the liquid crystal display panel.

8. The liquid crystal display of claim 6, wherein the vertical portion of the cover bottom comprises:

a fourth body having one end connected to one end of the horizontal portion and the other end extended toward the glass diffuser;

a fifth body having one end connected to the other end of the fourth body and the other end that is extended to support the glass diffuser plate and in parallel to the horizontal portion; and a sixth body having one end connected to the other end of the fifth body and the other end that is inclined at a predetermined angle and is extended toward the horizontal portion of the cover bottom.

9. The liquid crystal display of claim 8, wherein a height from the horizontal portion to the third body is substantially the same as a height from the horizontal portion to the fifth body.

10. The liquid crystal display of claim 8, further comprising a reflective sheet accommodated in an inner space provided by the vertical portion and the horizontal portion of the cover bottom, wherein at least one side of the reflective sheet is bent at a predetermined angle and is placed on at least one of the second body and the sixth body.

11. The liquid crystal display of claim 6, wherein the support member is in direct contact with the lateral side of the glass diffuser plate.

12. The liquid crystal display of claim 6, wherein the circuit unit includes a flexible film attached to at least one side of the liquid crystal display panel and driver integrated circuits mounted on the flexible films, wherein the support member includes a second support member fixed to at least one of the upper glass substrate and the lower glass substrate, and wherein the support member is disposed on at least one surface of the flexible film.

13. The liquid crystal display of claim 6, further comprising:

a flexible film attached to the liquid crystal display panel, and a plurality of driver integrated circuits mounted on the support member and flexible film, wherein the support member includes a second support member fixed to at least one of the upper glass substrate and the lower glass substrate, and wherein the second support member is a flexible film.

14. A liquid crystal display, comprising:

a liquid crystal display panel including an upper glass substrate and a lower glass substrate facing each other with a liquid crystal layer interposed therebetween;

a glass diffuser plate disposed below a lower surface of the liquid crystal display panel;

an adhesive layer attaching the liquid crystal display panel and the glass diffuser plate at an edge thereof;

a light source disposed below a lower surface of the glass diffuser plate;

a cover bottom including a vertical portion that supports an edge of the glass diffuser plate at the lower surface of the glass diffuser plate and faces a side of the light source, and a horizontal portion that is extended from the vertical portion and faces a lower surface of the light source; and a reflective sheet disposed on the cover bottom and including a first portion parallel to the horizontal portion of the cover bottom and a second portion extended from the first portion with an inclined angle, wherein the vertical portion of the cover bottom has three bodies that include one inclined body with respect to the horizontal portion of the cover bottom, and the second portion of the reflective sheet is attached onto the one inclined body of the vertical portion of the cover bottom, which provide a closed space by the horizontal and vertical portions of the cover bottom and the second portion of the reflective sheet.

\* \* \* \* \*